United States Patent [19]

Carter

[11] Patent Number: 4,536,494

[45] Date of Patent: Aug. 20, 1985

[54] ANIMAL FEED METHOD EMPLOYING NATAMYCIN

[76] Inventor: A. Franklin Carter, 705 E. Highpoint, Springfield, Mo. 65807

[21] Appl. No.: 608,796

[22] Filed: May 10, 1984

Related U.S. Application Data

[63] Continuation-in-part of Ser. No. 552,771, Nov. 17, 1983, abandoned.

[51] Int. Cl.$^3$ ...................... A61K 31/71; C07H 17/08
[52] U.S. Cl. ........................................ 514/31; 536/6.5
[58] Field of Search .......................... 424/180; 536/6.5; 514/31

[56] References Cited

U.S. PATENT DOCUMENTS 2,903,356  9/1959  Lampen et al. ..................... 424/180
3,945,993  3/1976  Schaffner et al. .................... 536/6.5
3,957,754  5/1976  Aszalos et al. ....................... 536/6.5

OTHER PUBLICATIONS

Coates et al., "A Mode of Action of Antibiotics in Chick Nutrition," *J. Sci. Food Agric.*, Jan. 3, 1952, pp. 43-48.
Groschke et al., "Effect of Antibiotics, Synthetic Vitamins, Vitamin B$_{12}$, and an APF Supplement on Chick Growth," *Research Notes*, pp. 616-618, 1950.
Cuthbertson, "Antibiotics in Nutrition," *J. Sci. Food Agric.*, Feb. 3, 1952, pp. 49-53.
Fountaine et al., "The Effects of an APF Concentrate Containing Aureomycin on the Growth and Well-Being of Young Dairy Calves", (abstract), *J. Animal Science*, vol. 9, No. 1, Feb. 1950, pp. 646-647.
Underkofler et al., *Industrial Fermentations*, vol. II, 1954, pp. 342-343.
Clark et al., "Pimaricin, A New Food Fungistat," *Microbial Inhibitors in Food*, Fourth International Symposium on Food Microbiology, 1964, at Swedish Institute for Food Preservation Research.
Morris et al., "Pimaricin—What Is It?", *Cultured Dairy Products Journal*, vol. 13, No. 3, p. 22, Aug., 1978.
Holz, "Polyene Antibiotics: Nystatin, Amphotericin B, and Filipin," *Antibiotics*, vol. V, Part 2, pp. 313-315, 1979.
Hockenhull, ed., "Production of Polyene Antifungal Agents by Streptomycetes," *Progress in Industrial Microbiology*, vol. 6, pp. 3-19.
Lampen et al., "Differences in Action of Large and Small Polyene Antifungal Antibiotics," *Bulletin of the Research Council of Israel*, vol. 11A, No. 1, 1962.
De Kruijff et al., "Polyene Antibiotic-Sterol Interactions in Membranes of Acholeplasma Laidlawii Cells and Lecithin Liposomes,38 *Biochimica et Biophysica Acta*, 339, pp. 30-43, 1974.
Zygmunt, "Intracellular Loss of Potassium in *Candida albicans* after Exposure to Polyene Antifungal Antibiotics," *Applied Microbiology*, Nov. 1966, pp. 953-956.

*Primary Examiner*—Johnnie R. Brown
*Attorney, Agent, or Firm*—Lowe, King, Price & Becker

[57] ABSTRACT

An animal feed composition which comprises a conventional animal feed and a feed efficiency-effective amount of natamycin. The feed composition may comprise natamycin in a range of about 0.000055 to 0.011 weight percent. A premix for incorporation into such animal feeds preferably comprises about 2-25 grams of natamycin admixed with about one pound of an inert carrier, such as rice hulls or calcium carbonate. One pound of premix is added to about one ton of the conventional animal feed.

9 Claims, No Drawings

ANIMAL FEED METHOD EMPLOYING NATAMYCIN

CROSS-REFERENCE TO RELATED APPLICATIONS

The present application is a continuation-in-part of application Ser. No. 552,771, filed Nov. 17, 1983, now abandoned.

FIELD OF THE INVENTION

The present invention relates to feed efficiency agents and to animal feeds having these feed efficiency agents incorporated therein. The present invention also relates to methods for producing and using such feed efficient compositions.

BACKGROUND ART

It is known in the art to add various materials to animal feeds to achieve a number of purposes. One such purpose is set forth in applicant's above-identified parent application wherein natamycin is added to conventional animal feeds as an antifungal agent.

Numerous additives have been proposed for animal feeds as growth promoting agents. Antibiotics in particular have been proposed as growth promoting additives. For example, Coates et al., "J. Sci. Food Agric.", 3, pp. 43-48, January 1952, suggest procaine penicillin as an agent of this type. Coates et al. also discuss similar effects of streptomycin, sulphasuccidine, sulphaquinoxaline, 4-hydroxy-3-nitrophenylarsonic acid, aureomycin, terramycin, and polymyxin, disclosed in work by other authors. Groschke et al., "Research Notes", pp. 616-618 (1950), discuss chick growth effects of vitamin $B_{12}$, stertomycin, and aureomycin. In "J. Sci. Food Agric.", 3, pp. 49-53, February 1952 Cuthbertson discloses the value of vitamin $B_{12}$, and antibiotic supplements such as penicillin, as chick food additives. In an abstract by Fountaine et al., "Journal of Animal Science", Vol. 9, pp 646-647, February 1950, the use of aureomycin as a growth supplement for calves is discussed. Further, Underkofler and Hickey, in "Industrial Fermentations" pp. 342-343 (1954), discuss the use of antibiotics such as streptomycin as growth promoters. All of the antibiotics disclosed in these publications are antibacterial antibiotics and are believed to be useful because the eliminate harmful bacteria or reduce the number of microorganisms in the intestinal tract, as discussed by Underkofler and Hickey.

As disclosed in U.S. Pat. No. 2,903,356, to Lampen et al. a growth promoting supplement comprising a combination of an antibacterial antibiotic with a member of the class consisting of nystatin and amphotericin is useful. This composition was said to accelerate the growth of animals by administration of feedstuffs containing the growth promoting supplement. In this patent there is discussed the need to include a sufficient amount of a factor identified as an animal protein factor in order to promote maximum growth. Thus, as defined in this patent, the expression "growth promoting agent" is an agent which will achieve an acceleration in the growth rate of animals superior to that obtainable with a normal diet.

Nystatin is a member of the class of antibiotics known as polyene antibiotics. These antibiotics have activity against yeasts and fungi, but have no significant activity against bacteria.

The present invention is also concerned with animal feed additives. However, in the present invention, a feed efficiency agent is incorporated into the animal food, said feed efficiency agent being effective to cause an animal to grow to its normal weight while requiring less feed than normal. Thus, the additive of the present invention is to be distinguished from growth promotion agents as discussed, for example, in U.S. Pat. No. 2,903,356.

SUMMARY OF THE INVENTION

It is accordingly one object of the present invention to provide a novel feed efficiency agent and feed compositions containing the feed efficiency agent.

It is a further object of the present invention to provide a method for increasing the efficiency of animal feed compositions by the addition thereto of a feed efficiency agent comprising natamycin.

A still further object of the present invention is to provide a method for the efficient growing of animals and poultry which comprises feeding said animals on a diet comprising conventional animal food containing the feed efficiency agent natamycin.

Other objects and advantages of the present invention will become apparent as the description thereof proceeds.

In satisfaction of the foregoing objects and advantages, the present invention provides an animal feed composition comprising a conventional animal feed and a food-efficiency amount of natamycin. The present invention also provides a method for treating animal feeds to improve their feed efficiency which comprises adding thereto an effective amount of natamycin as a feed efficiency agent.

DESCRIPTION OF THE PREFERRED EMBODIMENTS

As pointed out above, the present invention is concerned with a feed efficiency agent, methods for incorporation of the feed efficiency agent into animal feeds, and methods for growing animals by feeding said animals a conventional animal food containing natamycin as a feed efficiency agent.

It has been found according to the present invention that natamycin is an unusually effective feed efficiency agent for incorporation into animal feeds. Incorporation of the feed efficiency agent of this invention will permit an animal to attain a normal weight in the conventional period of time using less feed than normally required. The feed efficiency agent is incorporated into the animal feed at the rate of about 10-50 grams per ton of feed. The preferred method of incorporation of the feed efficiency agent is by dry blending since the feed efficiency agent is a solid.

The feed efficiency agent of this invention is natamycin. This material is also known as pimaricin or tennectin. It is a known compound and was isolated in the late 1950's from the fermentation broth of a culture of *Streptomyces natalensis.* (See Struyke et al., *Antibiotics Annual,* 1957-1958, page 876.) This organism was discovered in a soil sample taken from near Pietermaritzburg in South Africa. Natamycin is also produced by *Streptomyces chattanoogensis.*

Natamycin is a creamy white, odorless, taseteless, practically insoluble crystalline amphoteric powder. It belongs to the polyene macrolide or macrocyclic lactone group of compounds. (See generally, Clark et al. "Pimaricin, A New Food Fungistat", *Microbial Inhibi-*

*tors in Food,* Food International Symposium on Food Microbiology 1964 at the Swedish Institute for Food Preservation Research.) In low concentrations, natamycin is a potent inhibitor of fungal microorganisms. It is reported to have been tested in vitro on over five hundred fungal organisms with very positive effects.

Natamycin is relatively stable when in a dry state or when mixed with dry diluents. However, the molecule is sensitive to ultraviolet light, oxygen, or extreme pH values. It is relatively insoluble in water in which its solubiity is of the order 0.005–0.010 weight/weight percent. Additionally, even in solution, natamycin is rather unstable. Aqueous solutions of 6 mcg/ml of natamycin become microbiologically inactive after twenty-four hour exposure to light. Inactivation of natamycin by light, peroxides or oxygen proceeds at the fastest rate in solution or suspension. Natamycin is also sensitive to heavy metals, and may lose up to 75% of its effectiveness in four or five hours in their presence.

Natamycin has been used to treat several human clinical fungal infections, such as Candidiasis and Trichomoniasis. As reported in the British National Formulary, natamycin is sold under the trade name "Pimafucin", produced by Brocades in oral suspension, suspension for inhalation, cream and vaginal tablet formulations. Natamycin has also been used for various epidermal fungal infections such as corneal ulcers.

Natamycin has also been of interest in treatment of food products because it is highly active against yeasts and molds, as opposed to bacteria. (See Morris and Hart, "Pimaricin—What Is It?", *Culture Dairy Products Journal,* Vol. 13, page 22, 1978.) Reportedly, natamycin has been applied to food products in several ways. It has been added in dry form to liquids, slurries, pastes and semisolids when adequate mixing can be accomplished, or the pure natamycin can be mixed with one or more of the dry ingredients and then added to a given food product. Solid foods requiring surface protection can be dipped, misted, fogged or dusted with a solution or suspension of natamycin. Additionally, it has been suggested that protection from yeast and molds may be achieved in solid food by incorporating natamycin homogeneously into the food itself. (See Clark et al., cited above.)

As described in my copending application Ser. No. 552,771, filed Nov. 17, 1983, natamycin can be added to animal feeds to achieve an antifungal effect in the food.

Natamycin has also been used to retard spoilage of dressed poltry, to protect cottage cheese, and has been widely used in the dip-treatment of cheeses to coat them with the fungicide which is absorbed slightly, and dries to form a solid, surface coating. Various other reports suggest that natamycin is effective in the treatment of fresh berries, tomatoes, strawberries and raspberries. These reports indicate that natamycin has an antiyeast activity when added to wines, and various fruit juices, such as apple juice or orange juice. (See Morris and Hart, and Clark, cited above.) Natamycin is also used on meat products such as sausage.

Natamycin is a member of the class of antibiotics known as polyenes, which are toxic to yeast and fungi but not to bacteria. Nystatin, filipin, amphotericin B and candicidin are also polyene antibiotics. The polyenes have molecular weights of approximatly 1,000. They possess large lactone rings which contain a non-polar transconjugated double bond system and a polar polyhydroxylic portion. However, the antibiotics differ in (1) the size of the ring, and (2) the number of conjugated double bonds. See Holz, "Antibiotics", Vol. V, Part 2, pp. 313–315 (1979). As reported by Hockenhull, "Progress in Industrial Microbiology", Vol. 6, pp. 3–19, at page 4, natamycin has six hydroxyl groups whereas nystatin, for example, has thirteen hydroxyl grups.

While natamycin is a polyene antibiotic, it appears to differ substantially in structure and activity from other members of the class. Thus, as pointed out by Lampen et al. in "Bulletin of the Research Council of Israel", Section A, Chemistry, Proceedings of the XXXth Meeting of the Israel Chemical Society, Vol. 11A, No. 1, pp. 286–291 (April, 1962), two distinct groups of polyenes exist, and they may be divided into the two groups on the basis of the number of C atoms and glucolysis inhibition activity. As shown in Table I on page 289, nystatin is a large polyene, whereas pimaricin (natamycin) is a small polyene.

Similar differences are noted by De Kruijff et al., Biochim. et Biophys. Acta, 339, pp. 30–43 (1974), where it is pointed out that pimaricin or natamycin has significant permeability differences when compared with the other polymers studied. Thus, pimaricin was the only polyene which was not able to produce permeability changes in *A. laidlawii* cells and egg lecithin liposomes.

In a publication by Zygmunt, "Applied Microbiology", pp. 953–956 (November 1966), the polyene antibiotics as a class were studied for their effect on growth and fate of intracellular $K^+$. As reported in this publication, these antibiotics appear to exhibit growth-inhibitory activities. From this publication, and those discussed above with respect to the mechanism of effect by the anit-bacterial antibiotics, it would not be expected that any of the polyenes would have a growth effect.

It was therefore unexpected that the natamycin would have any effect when added to animal feeds. The unexpectedly achieved effect is not that of a growth promoting agent, but is rather activity as a feed extender or feed efficiency agent. The advantage realized by the addition of natamycin to an animal feed is that less feed can be fed to raise an animal to its conventional weight in the normal period of time. This is a substantial advantage in the commercial livestock and poultry industries.

In a composition aspect, the present invention provides an animal feed composition comprising a conventional animal feed and a feed efficiency agent effective amount of natamycin. In a further composition aspect, this invention relates to an animal feed comprising about 0.000055 to 0.011 weight percent of natamycin as a feed efficiency agent in combination with a suitable inert carrier, with the balance of the composition being a conventional animal feed. In this specification, the term "animal feed" includes feed for poultry as well as for animals such as livestock.

A further composition aspect of the present invention relates to a premix for incorporation into a conventional animal feed, most preferably comprising about 8 to 15 grams of natamycin admixed with about one to three pounds of an inert carrier per ton of feed. The inert carrier may be formed of such ingredients as rice hulls or calcium carbonate.

In a method of use aspect, the present invention relates to a method for treating animal feed, comprising dry blending of about 0.000055 to 0.011 weight percent of natamycin combined with a suitable premix carrier with a conventional animal feed.

In a further method aspect, this treated animal feed is fed to animals at a rate to achieve the conventional weight gain of the animal over the normal period of time but using less total feed.

The present invention is generally directed to a feed composition that includes natamycin as a feed efficiency agent. Animal feed is largely composed of grain and cereal products, but may also include meat byproducts as a minor ingredient. Additionally, animal feed may include citrus pulp and grape hulls, either or both being present at less than about 5% by weight. Animal feed an also include added fats, minerals and vitamins such as riboflavin, and trace metals.

Animal feed for feeding poultry, which is a preferred feature of the invention, includes protein, fat, fiber, calcium and phosphorus. A preferred feed would include corn and/or wheat, fat, meat meal, soybean meal, minerals and vitamins.

Animal feed is generally formed by cracking or grinding grain, rather than by incorporating the intact grain particles. These ground or cracked particles in the feed are roughly 1/100 of the original grain size. Animal feeds are composed of many different particles, typically in a range between 1/32 of an inch, or less, to ⅛ of an inch in diameter. Additionally, the cracking process exposes higher moisture and different nutrient concentrations than are typically present at the surface of the grain particle, which usually has a hull or other coating. Thus, the increased moisture content of conventional feeds further decreases the stability of natamycin according to the literature in this art.

Feed is usually exposed to light during its manufacture. It is then typically stored in dark bins with lids to keep out moisture. However, the moisture content of feed ranges from 10-30%. Additionally, in use, uneaten leftover feed is thoroughly exposed to light, as it is retained in the pans which are typically found in automated feed systems. Thus, some feed may be retained for a week or more before it is consumed in an environment of high moisture and with exposure to ultraviolet and visible light rays.

Surprisingly, it has been found that natamycin, when added to animal feedstuffs, exhibits a significant feed efficiency factor despite the extended presence of moisture which tends to inactivate the compound. Natamycin, as indicated above, is quickly inactivated upon exposure to ultraviolet light of certain wave lengths, and in the present of riboflavin, visible light also inactivates the natamycin. This theoretically also renders natamycin relatively less stable in feed. The presence of heavy metals in trace amounts would be expected to still reduce natamycin stability.

A surprising aspect of the present invention, as shown by the actual experiments described hereinafter, is that when natamycin is added in the indicated amounts to the animal feedstuffs, the natamycin appears to act to increase the efficiency of the feed. Thus, when the animals are fed a conventional diet, normal weight can be obtained for the age of the animal while reducing the amount of feed which is necessary to achieve the normal weight. The data set forth in the experimental portion of this application show that feed efficiency is substantially improved in normal feeding procedures. Thus, in twenty-one day performance data, using chicks as the animal, a significantly improved feed efficiency was obtained without adverse effects.

Natamycin is available under the trade name Delvocid produced by the Gist Brocades company of the Netherlands. As supplied, Delvocid contains about 50% natamycin. Natamycin may be dissolved with stirring at room temperature for about five minutes by adding about 2-25 grams, for example, of natamycin crystals to propylene glycol or methanol, or other solvent in which natamycin will dissolve. Because of natamycin's limited solubility, it will not go completely into solution, but may form a suspension. As optimal volume for suspending 2-25 grams of natamycin is approximately 30-60 ml. Preferably, such an amount of natamycin will be added to about one pound of a conventional premix, and will not overly wet it. The one pound of premix is then added to about one ton of feed.

Preferable premix compositions include rice hulls which are readily available from grain brokers, or from the J. B. Hunt Company in Rodgers, Ark. Rice hulls are preferred because of their relatively low price; however, other premix materials may be used, such as calcium carbonate (limestone), soybean mill feed, or corn cob fractions, as examples. Other premix materials may be utilized, but they must be inert as are the other suggested premix materials. The natamycin suspension is added to the premix material, and then mixed for about ten minutes in a standard horizontal or vetical blender. Alternatively, natamycin in a dry powder form could be directly blended into feed; however, more extended mixing times would be required.

The preferred additive range of natamycin in the finished feed is about 0.000055 to 0.011 weight percent (about 0.5 to 100 grams per ton of feed), preferably about 0.000055 to 0.0055 weight percent (about 0.5 to 50 grams per ton), more preferably about 0.00022 to 0.0028 weight percent (about 2 to 25 grams per ton), and most preferably about 0.00088 to 0.0017 weight percent (about 8 to 15 grams per ton). This amount of natamycin is prepared, as discussed above, by suspending it in an appropriate carrier solvent and adding it to about one pound of a premix carrier. There is no evidence that use of the higher amounts would cause any toxicity problems in treated animals; however, the considerations of cost and undue wetting of the premix carrier may become significant. Because the premix will be added to one-ton charges of feed, the correspondence between resulting concentration in the feed is such that about one gram of natamycin added to the premix yields about a one ppm concentration of natamycin in the feed (about 0.0001 weight percent). Thus, 10 grams of natamycin added to one pound of premix, which in turn is added to a ton of feed, yields about a 10 ppm effective natamycin concentration.

Feed is conventionally prepared in a large bin or mixer in which the feed ingredients are added in descending weight order according to their prevalence in the ultiate feed mixture. Thus, cracked grain would be the primary ingredient. Minor ingredients are then added. Micro-ingredients are added last. These include vitamins, drugs, growth promoters, antibiotics, and the natamycin. Thus, natamycin is one of the micro-ingredients and is added to the feed in the final blending step. The feed is blended for conventional time periods. Individual farmers can also mix a natamycin premix with feed but this would require a small mixer such as is conventionally run by the power takeoff of a tractor. Five minutes is usually sufficient to blend natamycin in its premix form with small batches of feed materials.

The feed comprising the natamycin is fed to animals at standard feed dosage ranges and rates. No changes in feeding patterns are necessitated by the inclusion of natamycin into the animal feedstuff. Natamycin is suitable for incorporation in the feed of swine, poultry, turkeys, dairy animals, horses, dogs, rabbits, fish and other animals which are not specifically mentioned.

The following examples illustrate the preparation of a natamycin treated premix:

EXAMPLE I

In 300 ml of propylene glycol, add 100 gm of natamycin. Stir at room temperature for about five minutes to dissolve some of the natamycin and to form a suspension with the remaining natamycin. Then, take 4 lb of dried rice hulls and place in a small, conventional horizontal mixer. Pour the 300 ml of natamycin solution/suspension over the rice hulls in the mixer and mix for ten minutes. By this technique, enough natamycin-treated premix can be prepared to treat about 4 tons of feed in order to achieve about a 25 ppm natamycin feedstuff (about 0.0028 weight percent).

EXAMPLE II

In this evaluation, the natamycin additive was evaluated on male broiler performance using commercial male broiler chicks. The broiler chicks included fifty male broiler chicks which were placed in pens to provide a bird density of 0.7 square foot per bird. Normal vaccination and other procedures were followed. Feed and water were given ad libertum. Reused litter was used, all pens were top dressed with two inches of new wood shavings. The broiler diet which meets NRC recommendations is set forth in the following Table I and shows the starter diet, the grower diet and the finisher diet. The starter diet is for the first two weeks, and the finisher diet is for the last week. The grower diet is for the period between start and finish. The table is as follows:

TABLE I

Broiler Diets
Formulas and Nutrient Specifications

| Percentage | Starter | Grower | Finisher |
|---|---|---|---|
| Corn/Wheat | 59.0 | 64.0 | 69.0 |
| Fat | 4.0 | 4.0 | 4.0 |
| Meat Meal | 5.0 | 5.0 | 5.0 |
| Soybean Meal | 30.0 | 25.0 | 20.0 |
| dl-methionine | 0.18 | 0.17 | 0.1 |
| Defl. Phos. | 1.25 | 1.2 | 1.15 |
| Salt | 0.25 | 0.25 | 0.25 |
| Trace Minerals | 0.05 | 0.05 | 0.05 |
| Vitamin PMX | 0.15 | 0.15 | 0.15 |
|  | 99.88 | 99.82 | 99.7 |
| Protein | 22.0 | 20.0 | 18.0 |
| Fat | 6.5 | 6.7 | 6.85 |
| Fiber | >3.0 | >3.3 | 3.5 |
| Ca | 1.0 | 0.8 | 0.6 |
| Phos., available | 0.45 | 0.42 | 0.4 |
| Kcal (M.E.) | 1420.0 | 1450.0 | 1480.0 |

Treatments were assigned at random with blocks of six pens. All the treatments contained flavomycin at the rate of 1 gram per ton and Coban at the rate of 100 ppm. The feed was prepared as crumbles at 0–21 days and as pellets from 21–42 days. No withdrawal feed was given since all birds and unused feed were destroyed at final weighing date. The feeds also contained the indicated amount of natamycin, treatment 1 not containing any natamycin and thus being used as the control. Treatments 2, 3 and 4 contained 10, 20 and 50 grams per ton of natamycin. The following table sets forth the treatment data including the additive and pen numbers together with observations.

TABLE II

| Treatment | Flavomycin g/ton | Coban g/ton | Notamycin g/ton | Pen Nos. |
|---|---|---|---|---|
| 1 | 1 | 100 | 0 | 1,6,9,13,19,22 |
| 2 | 1 | 100 | 10 | 3,7,12,14,19,21 |
| 3 | 1 | 100 | 20 | 2,8,11,15,17,24 |
| 4 | 1 | 100 | 50 | 4,5,10,16,20,23 |

Observations and Data:
1. Weights by pen at 21 and 42 days of age.
2. Feed consumption for first 21 days and for the entire period.
3. Mortality daily and possible cause for death.
4. Gross observation was recorded for litter moisture, shank color, feathering and organic abnormalities.
5. All birds and unused feed were destroyed and not sold for human consumption.

The results of these experiments are set forth in the following table. In Table III each of the treatment groups is identified by treatment number, pen number, the number of birds started, the mortality rate and the weights of the birds, the average weight in grams and the feed efficiency. The results in Table III are 21 day performance data and are as follows:

TABLE III

| Treatment | Pen No. | Started | Mortality | Weighed | Average Weight grams | Feed Efficiency |
|---|---|---|---|---|---|---|
| 1 | 1 | 50 | 1 | 49 | 504 | 1.70 |
|  | 6 | 50 | 1 | 49 | 533 | 1.62 |
|  | 9 | 50 | 0 | 50 | 542 | 1.56 |
|  | 13 | 50 | 1 | 49 | 549 | 1.58 |
|  | 19 | 51 | 0 | 51 | 522 | 1.70 |
|  | 22 | 49 | 1 | 48 | 519 | 1.67 |
| Total and Average |  | 300 | 4 | 296 | 528 | 1.64 |
| 2 | 3 | 49 | 1 | 48 | 513 | 1.61 |
|  | 7 | 50 | 0 | 50 | 540 | 1.52 |
|  | 12 | 49 | 0 | 49 | 541 | 1.55 |
|  | 14 | 50 | 0 | 50 | 506 | 1.55 |
|  | 18 | 47 | 0 | 47 | 557 | 1.54 |
|  | 21 | 55 | 1 | 54 | 509 | 1.67 |
| Total and Average |  | 300 | 2 | 298 | 528 | 1.57 |
| 3 | 2 | 50 | 1 | 49 | 518 | 1.61 |
|  | 8 | 50 | 2 | 48 | 535 | 1.54 |
|  | 11 | 49 | 0 | 49 | 531 | 1.62 |
|  | 15 | 50 | 2 | 48 | 523 | 1.63 |
|  | 17 | 49 | 0 | 49 | 537 | 1.60 |
|  | 24 | 52 | 0 | 52 | 500 | 1.61 |
| Total and Average |  | 300 | 5 | 295 | 524 | 1.60 |
| 4 | 4 | 50 | 0 | 50 | 522 | 1.58 |
|  | 5 | 50 | 0 | 50 | 556 | 1.50 |
|  | 10 | 49 | 0 | 49 | 522 | 1.50 |
|  | 16 | 55 | 0 | 55 | 551 | 1.50 |
|  | 20 | 54 | 1 | 53 | 530 | 1.60 |
|  | 23 | 49 | 0 | 49 | 543 | 1.60 |
|  |  | 307 | 1 | 306 | 537 | 1.55 |

As will be seen in Table III, there is a strong indication that the natamycin-treated chicks provided better feed efficiency without adverse effects. Thus, a comparison of Treatment Group 1, whose feed did not contain natamycin, shows that the total and average feed efficiency was 1.64. This is substantially higher than the feed efficiency for Group 2, which is 1.57, Group 3, which is 1.60, and Group 4, which is 1.55. A comparison of the last two columns of Table III shows comparable or greater average weight of the chicks using less feed. This thus demonstrates the effectiveness of natamycin as a feed efficiency agent.

The following table sets forth the 42 day performance summary of the chicks including rank by average weight. Table IV is as follows:

TABLE IV

42-day Performance Summary

| Treatment | | Rank |
|---|---|---|
| | Average Weight | |
| 2 | 1743 | 1 |
| 3 | 1735 | 2 |
| 4 | 1720 | 3 |
| 1 | 1716 | 4 |
| | Adjusted Feed Efficiency | |
| 2 | 1.80 | 1 |
| 3 | 1.81 | 2 |
| 4 | 1.82 | 3 |
| 1 | 1.85 | 4 |

As will be noted from Table IV, Treatment 2 had the best overall performance with the highest average body weights and the lowest feed efficiency of 1.80.

The following table sets forth the liveability rate of the chicks during the treatment period. This rate is from 0 to 42 days and shows that the mortality rate was comparable for the treated and untreated chicks. In fact, the Treatment 2 group is substantially improved over the control and the Treatment 1 group. Table V is as follows:

TABLE V

| | | | | Liveability - 0–42 Days | | |
|---|---|---|---|---|---|---|
| | Pen | No. | No. | Mortality | | |
| Treatment | No. | Started | Ended | Loss | % | Probable Cause |
| 1 | 1 | 50 | 49 | 1 | 2.0 | NGL |
| | 6 | 50 | 48 | 2 | 4.0 | NGL, AR |
| | 9 | 50 | 50 | 0 | 0 | |
| | 13 | 50 | 48 | 2 | 4.0 | NGL, AR |
| | 19 | 51 | 51 | 0 | 0 | |
| | 22 | 49 | 48 | 1 | 2.0 | NGL, CU |
| Total & Avg. | | 300 | 294 | 6 | 2.0 | |
| 2 | 3 | 49 | 48 | 1 | 2.0 | AR |
| | 7 | 50 | 50 | 0 | 0 | |
| | 12 | 49 | 49 | 0 | 0 | |
| | 14 | 50 | 50 | 0 | 0 | |
| | 18 | 47 | 47 | 0 | 0 | |
| | 21 | 55 | 53 | 2 | 4.0 | NGL, CU |
| Total & Avg. | | 300 | 297 | 3 | 1.0 | |
| 3 | 2 | 50 | 49 | 1 | 2.0 | AR |
| | 8 | 50 | 48 | 2 | 4.0 | NGL, NGL |
| | 11 | 49 | 49 | 0 | 0 | |
| | 15 | 50 | 47 | 3 | 6.0 | AR, AR, NGL |
| | 17 | 49 | 49 | 0 | 0 | |
| | 24 | 52 | 51 | 1 | 1.9 | NGL |
| Total & Avg. | | 300 | 293 | 7 | 2.3 | |
| 4 | 4 | 50 | 48 | 2 | 4.0 | NGL, AR |
| | 5 | 50 | 48 | 2 | 4.0 | NGL, INJ |
| | 10 | 49 | 48 | 1 | 2.0 | CU |
| | 16 | 55 | 55 | 0 | 0 | |
| | 20 | 54 | 53 | 1 | 1.9 | CU |
| | 23 | 49 | 49 | 0 | 0 | |
| Total & Avg. | | 307 307 | 301 | 6 | 2.0 | |

CODE:
AR - Aoritic Rupture
CU - Cull
NGL - No Gross Lesions
INJ - Injury

The invention has been described herein with reference to certain preferred embodiments; however, as obvious variations thereof will become apparent to those skilled in the art, the invention is not to be considered as limited thereto.

I claim:

1. A method for improving the use of animal feed by an animal which comprises incorporating about 0.000055 to 0.011 weight percent of natamycin into the animal feed as a feed efficiency agent.

2. A method according to claim 1 wherein the natamycin is incorporated into the animal feed in admixture with an inert carrier as a premix.

3. A method according to claim 1 wherein the natamycin is dry blended into the animal feed.

4. A method according to claim 2 wherein the premix comprises about 8 to 15 grams of natamycin admixed with about 1 to 3 pounds of an inert feed as the carrier.

5. A method according to claim 4 wherein the inert carrier is selected from the group consisting of rice hulls, calcium carbonate, soy bean mill feed, and corn cob fractions.

6. A method according to claim 1 wherein the natamycin is added to the animal feed as a solvent suspension.

7. A method according to claim 1 wherein the animal feed comprises grain and cereal products.

8. A method according to claim 7 wherein the animal feed includes meat by-products, citrus pulp and grape hulls.

9. A method according to claim 1 wherein the natamycin is incorporated into the feed composition in an amount of about 0.00088 to 0.0017 weight percent.

* * * * *